(12) United States Patent
Ajanovic

(10) Patent No.: US 6,298,426 B1
(45) Date of Patent: *Oct. 2, 2001

(54) CONTROLLER CONFIGURABLE FOR USE WITH MULTIPLE MEMORY ORGANIZATIONS

(75) Inventor: Jasmin Ajanovic, Folsom, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,293

(22) Filed: Dec. 31, 1997

(51) Int. Cl.[7] ................................ G06F 12/00
(52) U.S. Cl. ................ 711/172; 711/5; 711/154; 365/51; 365/230.03; 365/230.06
(58) Field of Search .................. 711/2, 5, 100, 711/103, 170, 171, 172, 154; 395/402, 405, 497.01; 365/51, 230.03, 230.06

(56) References Cited

U.S. PATENT DOCUMENTS

| | | | |
|---|---|---|---|
| 5,873,112 | * | 2/1999 | Norman ............................ 711/103 |
| 5,895,481 | * | 4/1999 | Yap .................................... 711/5 |
| 6,060,905 | | 5/2000 | Bickford et al. . |

OTHER PUBLICATIONS

Intel Corp., "Peripheral Components," pp. 1–1, 1–160 to 1–176, Nov. 1994.
Intel Corp., "Platform Components," pp. 1–71, 80–93 (Jan. 1998).

* cited by examiner

Primary Examiner—Matthew Kim
Assistant Examiner—Pierre M. Vital
(74) Attorney, Agent, or Firm—Trop, Pruner & Hu, P.C.

(57) ABSTRACT

A memory controller for use with a memory sub-system selected to have one of multiple memory organizations. The memory controller includes output drivers connected to output pins, the output drivers being programmable to have one of multiple output characteristics. The memory controller also includes a configuration register storing a programmable value that determines the output characteristic.

29 Claims, 12 Drawing Sheets

| Bit | Description | | |
|---|---|---|---|
| 31:30 | MAA[1:0] Buffer Strength | | |
| | | Value | Buffer Strength |
| | | 00 | 48 mA. |
| | | 01 | 42 mA. |
| | | 10 | 22 mA. |
| | | 11 | Reserved |
| 29:28 | MECC[7:0] Buffer Strength | | |
| | | Value | Buffer Strength |
| | | 00 | 42 mA. |
| | | 01 | 38 mA. |
| | | 10 | 33 mA. |
| | | 11 | Reserved |
| 27:26 | MD[63:0] Buffer Strength | | |
| | | Value | Buffer Strength |
| | | 00 | 42 mA. |
| | | 01 | 38 mA. |
| | | 10 | 33 mA. |
| | | 11 | Reserved |

Figure 5A

| | |
|---|---|
| 25:24 | RCSA[0]# & RCSB[0]#/MAB[6] Buffer Strength<br><br>Value    Buffer Strength<br>00      48 mA.<br>01      42 mA.<br>10      22 mA.<br>11      Reserved |
| 23:22 | MAB[1:0] Buffer Strength<br><br>Value    Buffer Strength<br>00      48 mA.<br>01      42 mA.<br>10      22 mA.<br>11      Reserved |
| 21:20 | MAA[13:2] Buffer Strength<br><br>Value    Buffer Strength<br>00      48 mA.<br>01      42 mA.<br>10      22 mA.<br>11      Reserved |

Figure 5B

| | |
|---|---|
| 19:18 | RCSA[1]# & RCSB[1]#/MAB[7] Buffer Strength <br><br> Value     Buffer Strength <br> 00         48 mA. <br> 01         42 mA. <br> 10         22 mA. <br> 11         Reserved |
| 17:16 | RCSA[2]# & RCSB[2]#/MAB[8] Buffer Strength <br><br> Value     Buffer Strength <br> 00         48 mA. <br> 01         42 mA. <br> 10         22 mA. <br> 11         Reserved |
| 15:14 | RCSA[3]# & RCSB[3]#/MAB[9] Buffer Strength <br><br> Value     Buffer Strength <br> 00         48 mA. <br> 01         42 mA. <br> 10         22 mA. <br> 11         Reserved |

Figure 5C

| | |
|---|---|
| 13:12 | RCSA[4]# & RCSB[4]#/MAB[10] Buffer Strength<br><br>      Value      Buffer Strength<br>      00         48 mA.<br>      01         42 mA.<br>      10         22 mA.<br>      11         Reserved |
| 11:10 | CDQB[5,1]# Buffer Strength<br><br>      Value      Buffer Strength<br>      00         42 mA.<br>      01         38 mA.<br>      10         33 mA.<br>      11         Reserved |
| 9:8 | CDQA[5,1]# Buffer Strength<br><br>      Value      Buffer Strength<br>      00         42 mA.<br>      01         38 mA.<br>      10         33 mA.<br>      11         Reserved |

Figure 5D

| | |
|---|---|
| 7:6 | CDQA[7:6,4:2,0]#BUFFER STRENGTH<br><br>VALUE    BUFFER STRENGTH<br>00    42 mA.<br>01    38 mA.<br>10    33 mA.<br>11    RESERVED |
| 5:4 | RCSA[5]#&RCSB[5]#/MAB[11]BUFFER STRENGTH<br><br>VALUE    BUFFER STRENGTH<br>00    48 mA.<br>01    42 mA.<br>10    22 mA.<br>11    RESERVED |
| 3:2 | RCSA[6]#/MAB[2]&RCSB[6]#/MAB[12]BUFFER STRENGTH<br><br>VALUE    BUFFER STRENGTH<br>00    48 mA.<br>01    42 mA.<br>10    22 mA.<br>11    RESERVED |

FIG. 5E

| 1:0 | RCSA[7]#/MAB[3] & RCSB[7]#/MAB[13] Buffer Strength |
|---|---|
| | Value     Buffer Strength |
| | 00     48 mA. |
| | 01     42 mA. |
| | 10     22 mA. |
| | 11     Reserved |

CONTROLLER CONFIGURABLE FOR USE WITH MULTIPLE MEMORY ORGANIZATIONS

BACKGROUND

The invention relates to a controller configurable for use with multiple memory organizations.

In a typical computer system, various types of memory components are used, such as main memory, video memory, cache memory, and buffers used in various cards in the computer system. The sizes of memory components in a computer system have increased rapidly.

The size selected for a memory subsystem is dependent at least in part upon the type of computer system. With higher-end computer systems, such as network servers or computers running graphics intensive applications, the size of each memory component may be large. In consumer desktop systems, laptop systems, and other lower-end systems, smaller memory components may be used.

Due to their relatively high access speeds and low cost, dynamic random access memories (DRAMs) or synchronous DRAMs (SDRAMs) are popular choices as storage devices. Sample chip sizes for DRAMs and SDRAMs include 16 megabits (Mb) and 64 Mb.

Various techniques are used to mount memory chips to a printed circuit board (e.g., the motherboard, video controller card, disk controller card, network controller card) in a computer system. One technique is to directly mount the memory chips to the board. To increase memory chip density, multiple memory chips are mounted onto memory modules having interconnecting pins for connection or coupling to sockets on the board. The memory modules may be configured as single in-line memory modules (SIMMs), double in-line memory modules (DIMMs), or other type modules (e.g., multichip modules). Multiple sockets may be provided on each board to receive multiple modules to increase memory capacity.

Because of the widely varying amounts of memory employed among different types of systems, the number of memory chips that may be used may also vary widely. A memory controller that is used to control a memory subsystem provides a number of control, address, and data signals. As the number of memory chips increases, the capacitive loads placed on the control, address, and data signals also increase. A large change in the load capacitance may cause a corresponding change in the switching characteristics of an output signal driven by the memory controller. Drivers in the memory controller typically have predefined current drive capabilities that may be used with a range of output load capacitances. However, because of the potential disparity in the number of chips used in higher-end systems and in lower-end systems, the load capacitances for driven signals may vary significantly. For improved performance, one type of memory controller (with a high current drive capability) may be used in the higher-end systems to control large memory subsystems, while a second type of memory controller (with a lower current drive capability) is used in lower-end computer systems.

SUMMARY

The invention in one embodiment is generally directed to a controller that is configurable to provide different output signal drive characteristics depending upon the memory organization used in a system.

In another embodiment, the invention features a memory controller for use with a memory subsystem of a selected configuration. A storage element stores a programmable value set according to the configuration selected for the memory subsystem. Output signal drivers are configurable by the programmable value in the storage element to provide an output characteristic.

In another embodiment, the invention features a method of controlling a memory subsystem having one of multiple organizations in a computer. The method includes determining the memory organization and configuring a memory controller coupled to the memory subsystem to have a predetermined output drive strength based on the determined memory organization.

Other features and advantages will become apparent from the following description and from the claims.

BRIEF DESCRIPTION OF THE DRAWINGS

FIGS. 5A–5F illustrate contents of a memory buffer strength configuration register in the controller of FIGS. 4A–4C.

DETAILED DESCRIPTION

In the following description, a signal name followed by a "#" symbol indicates that the signal is active low.

Figure 1:
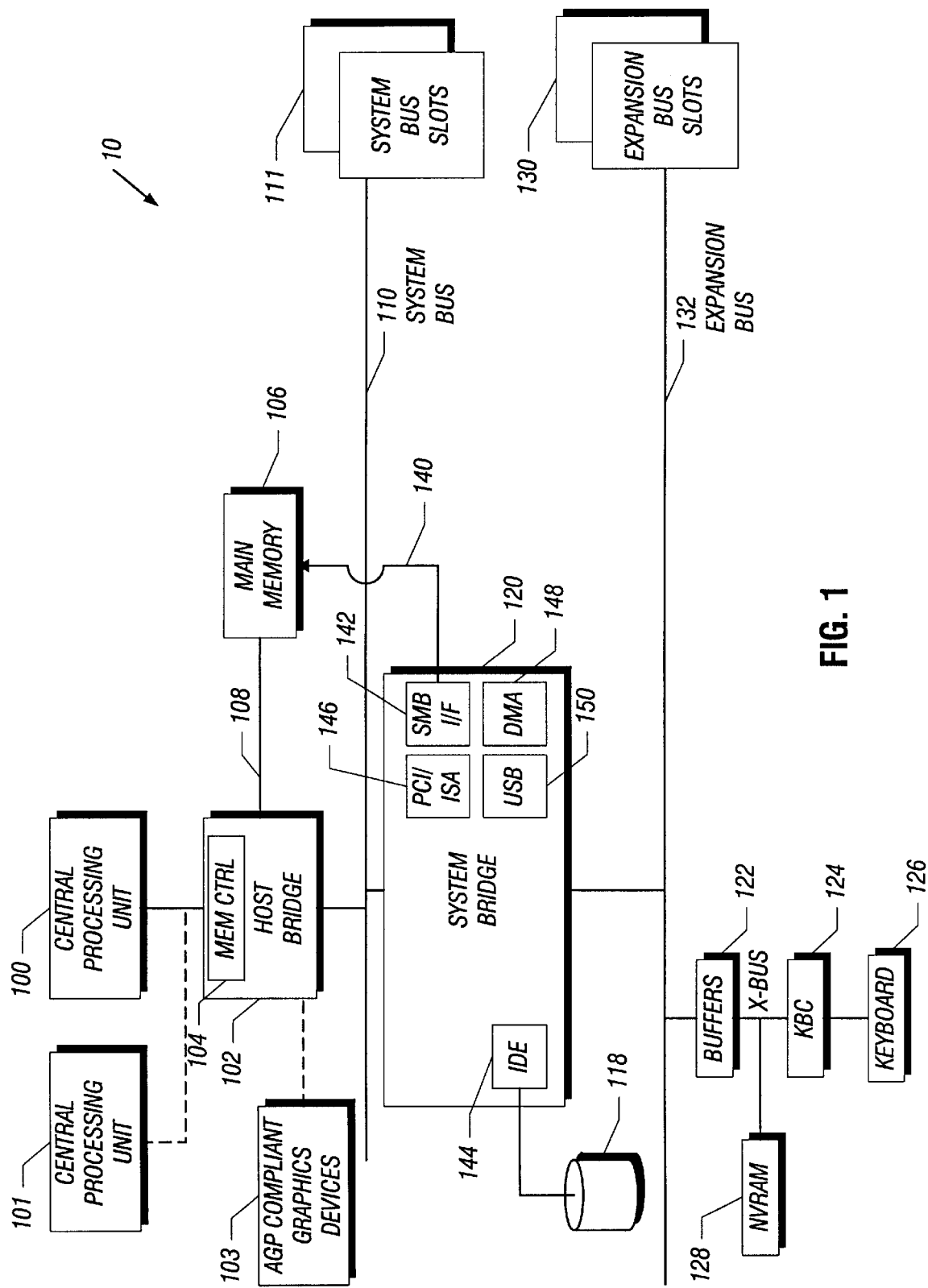
FIG. 1 is a block diagram of an embodiment of a computer system in accordance with the invention.

Referring to FIG. 1, an embodiment of a computer system in accordance with the invention includes a main memory 106 that is controlled by a memory controller 104. The memory controller 104 may be a discrete chip or pare of another controller, such as a host bridge 102 that is the interface between a central processing unit (processor) 100 and a system bus 110. The system bus 110 may be a Peripheral Component Interconnect (PCI) bus, as described in the PCI Local Bus Specification, Revision 2.1, published on Jun. 1, 1995. A memory bus 108 between the main memory 106 and the memory controller 104 includes control signals, address signals, and data signals.

The main memory 106 may be implemented in a number of different organizations. At least a "large" main memory organization and a "small" main memory organization are available. The memory controller 104 is configurable to work with the several memory organizations.

The host bridge 102 may include a number of integrated functions, including a host-to-PCI bridge and an accelerated graphics port (AGP) interface for use with AGP compliant graphics devices 103. AGP is described in detail in the Accelerated Graphics Port Interface Specificatian, Revision 1.0, published on Jul. 31, 1996. In addition, if desired, the host bridge 102 may support multiple processors, including the processor 100 and an additional processor 101. An example processor is the Pentium® II processor available from Intel Corporation.

System bus slots 111 are provided on the system bus 110 for coupling to additional peripheral devices, e.g., hard disk drive controllers, video controllers. The computer system 10 also includes an expansion bus 132 according to one of a number of expansion bus standards known in the art. Expansion slots 130 are located on the expansion bus 132 for receiving expansion cards.

The system bridge 120 may be the 82371SB part (the PIIX4 I/O bridge) from Intel, which includes various integrated functions, including a PCI-ISA bridge 146 and an integrated device electronics (IDE) controller 144 for controlling a hard disk drive 118. The system bridge 120 also includes a direct memory access (DMA) controller 148, a Universal Serial Bus (USB) (described in the Universal Serial Bus Specification, Revision 1.0, published on Jan. 15, 1996) host interface 150, and a system management (SM) bus interface 142 for coupling to an SM bus 140. The SM bus interface 142 may support the serial presence detect protocol to access predefined storage locations in the main memory 106 to determine the type of organization of memory used. The serial presence detect protocol is a standard set by the Joint Electron Device Engineering Council (JEDEC). The standard is refered to as JEDEC Standard 21-C, Configurations for Solid State Memories.

Buffers 122 are provided between the expansion bus 132 and an X-bus 129 that is coupled to more components, such as a nonvolatile memory 128 for storing a basic input/output system (BIOS) routine, which is executed in the computer system 10 during initial start-up. In operation, the BIOS routine may be copied to the main memory 106. The X-bus 129 is also coupled to a keyboard controller 124 for interfacing to a keyboard 126.

Although specific components in this embodiment of a computer system architecture are illustrated and described in connection with FIG. 1, other components and architectures may also alternatively be used.

Figure 2:
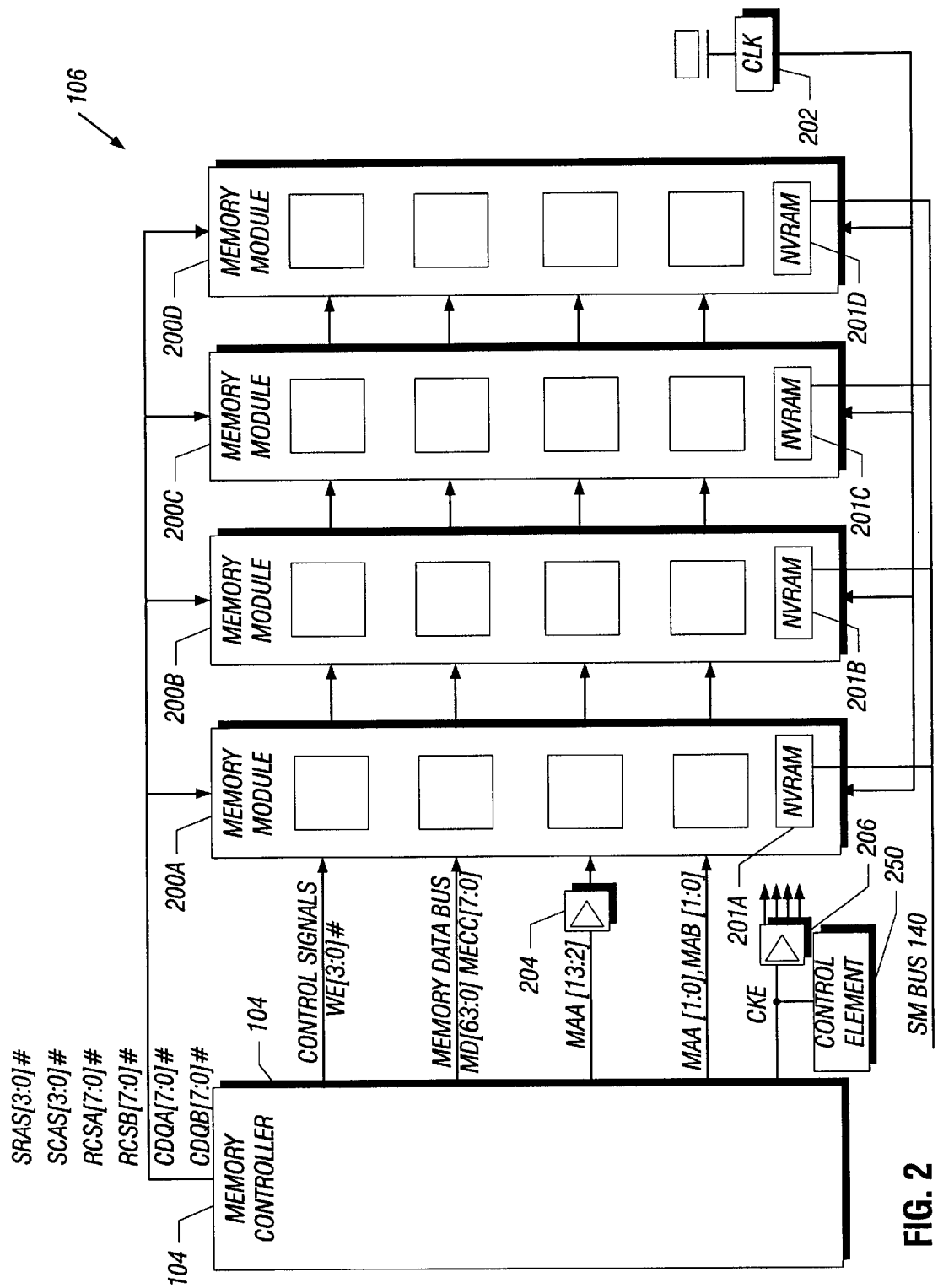
FIG. 2 is a block diagram of an embodiment of a memory subsystem according to a first memory organization in the system of FIG. 1.
Figure 3:
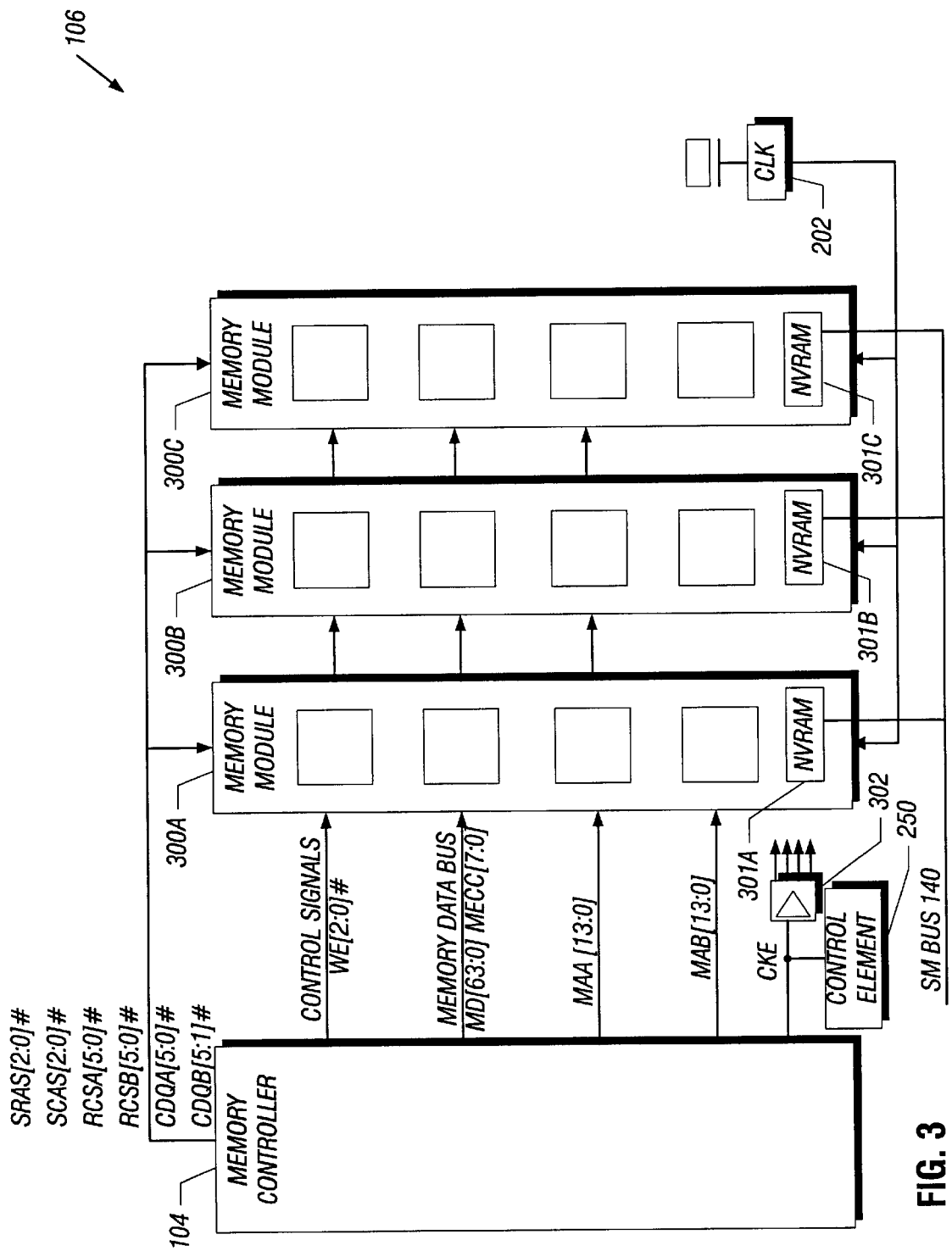
FIG. 3 is a block diagram of an embodiment of a memory subsystem according to a second memory organization in the system of FIG. 1.

As noted, the main memory 106 has multiple, different organizations. Referring to FIGS. 2 and 3, the main memory 106 includes multiple sockets for receiving multiple DIMM modules. The main memory may also be modified to include other types of memory modules, e.g., SIMM modules, MCMs, or to include discrete chips directly mounted to the motherboard.

The memory controller 104 may be set to one of multiple configurations to interface to the different memory organizations. In one memory organization, four DIMM modules 200A, B, C, D are used (FIG. 2). The memory controller 104 set to the configuration to interface to this memory organization may support 8 logical rows of memories in this embodiment. A row refers to a set of memory devices that are substantially simultaneously selected by one of multiple row address strobe signals (which are used to load a row address into the memory devices).

In a second memory organization, three DIMM modules 300A, B, C are used (FIG. 3). The memory controller 104 set to the configuration to interface to this second memory organization may support 6 logical rows of memory devices.

In addition, different types of DIMM modules may be used, such as DIMM modules having enhanced data output (EDO) DRAMs or DIMM modules having SDRAMs. The DIMM modules may be configured as single-sided or double-sided, and may include x4, x8, or x16 DRAMs or SDRAMs.

In this embodiment, each DIMM module 200 or 300 includes a nonvolatile memory (NVRAM) 201 or 301 according to the serial presence detect protocol. The information stored in the NVRAM indicates the type of memory module used, e.g., memory data width, ECC, memory size, DRAM or SDRAM. During start-up in one embodiment, a BIOS routine executed by the processor 100 programs the SMB interface 142 in the system bridge 120 to access predetermined locations in the NVRAMs 201 or 301. Based on the accessed information, the memory organization is determined and the configuration registers in the memory controller 104 are programmable by the BIOS to configure the memory controller 104 to provide the appropriate signals to the memory 106.

One configuration register includes a memory buffer strength configuration register 406 (FIG. 4C), which in this embodiment stores values for programming the current drive strength of output drivers in the memory controller. Thus, with a large main memory 106, certain output drivers in the controller may be programmed to have large drive strengths. In contrast, with a smaller main memory 106, the output drivers may be programmed to have smaller drive strengths.

In this embodiment, certain pins of the memory controller 104 are programmable to output different signals (e.g., the pins may be multiplexed) in the different memory organizations. To determine which configuration the memory controller 104 is in, the controller may be coupled to a predetermined pin, e.g., a clock enable (CKE) pin, whose state is sensed by the memory controller 104 during start-up.

The CKE pin provides an input signal to the memory controller 104 during system reset and an output signal during normal operation. If the CKE pin is at a first state as controlled by an element 250, the memory controller 104 outputs a first set of control and address signals. If the CKE pin is at a second state as controlled by the element 250, the memory controller outputs a second set of control and address signals. Selection of signals to output on the memory controller pins is performed by internal multiplexers (see FIGS. 4A–4C). The control element 250 may include, for example, a pull-up resistor (to pull CKE high) or an open circuit (in which case an internal pull-down resistor in the memory controller pulls CKE low).

Thus, the memory controller 104 is programmable to (1) drive different sets of output signals at its output pins depending on the main memory organization (the multiplexing function); and (2) have different output driver strengths as set by the memory buffer strength configuration register 406 depending upon the memory organization.

Among the advantages provided by the memory controller 104 is that, with the ability to program the memory controller to one of multiple configurations, one memory controller may be used to support multiple memory subsystems having different organizations. The same controller may be used in higher-end systems to enable a large memory subsystem and in lower-end systems to work with a smaller memory subsystem.

Referring to FIG. 2, the memory controller 104 in one embodiment provides various control, address, and data signals to the main memory 106, which in the first memory organization has four DIMM modules 200A, 200B, 200C and 200D. Memory control signals include row address strobe signals, column address strobe signals, write enable signals, and data mask signals. DRAMs and SDRAMs use different types control signals, as discussed below. Although specific signals are discussed in conjunction with the embodiments described, it is contemplated that other combinations and numbers of signals may be used.

Address signals are time multiplexed into the memory devices and are divided into row and column addresses. In the first memory organization, the following are the memory interface signals provided to the main memory 106: SRAS [3:0]#, which are four copies of the SDRAM row address strobe signal provided to SDRAM modules 200A, B, C, D, respectively; SCAS[3:0]#, which are four copies of the SDRAM column address strobe provided to SDRAM modules 200A–D, respectively; RCSA[7:0]#, which are row address strobes 7–0 for DRAMs, and chip select signals 7–0 for SDRAMs (each signal RCSA[X] selects one DRAM row to enable up to a maximum of eight rows); RCSB[7:0]#, which are extra copies of RCSA[7:0]#; CDQA[7:0]#, which are column address strobe signals for DRAMs, and I/O data mask signals for SDRAMs (synchronized output enable signals during reads and byte enable signals during writes); CDQB[5:1]#, which are copies of CDQA[5:1]#; and WE[3:0]#, which are four copies of the write strobe for DRAMs or SDRAMs.

A memory data bus of predefined width is coupled between the memory controller 104 and the memory modules 200. Without error detection and correction (EDC) capability, a memory data width may be 64 bits, corresponding to memory data bits MD[63:0]. With EDC, 8 check bits MECC[7:0] are added to the memory data bus (for a total of 72 bits) to enable error detection and correction of data retrieved from the main memory 106.

In the first memory organization, the memory addresses are outputted as MAA[13:2] plus two sets of copies of the two lower address bits: MAA[1:0] and MAB[1:0]. The bits MAA[1:0] are provided to two memory modules, while the bits MAB[1:0] are provided to two other memory modules to equalize loading. An external buffer 204 receives address signals MAA[13:2] to generate a copy of the upper address bits to provide to the modules 200A–D. If SDRAMs are used, the clock provided by a clock generator 202 is coupled to the modules 200 using SDRAMs.

Row address strobe or chip select signals RCSA&B[1:0]# are routed to the module 200A, RCSA&B[3:2]# are routed to the module 200B, RCSA&B[5:4]# are routed to the module 200C, and RCSA&B[7:6]# are routed to the module 200D.

The column address strobe or data mask signals CDQA[7:0]# are routed to DIMM modules 200A and 200B, and CDQA[7,6,4–2,0]# and CDQB[5,1]# are routed to DIMM modules 200C and 200D. The CKE signal (clock enable for SDRAMs) outputted by the memory controller 104 is buffered by a buffer 206, which provides four copies of the CKE signal, each provided to a corresponding one of the modules 200A–D. Four write enable signals WE[3:0]# are generated by the memory controller 104, with one copy for each memory module.

Referring to FIG. 3, the memory subsystem configured according to the second memory organization is illustrated, in which three memory modules 300A, 300B, and 300C are provided. In this organization, 6 logical rows may be supported. The memory interface signals from the memory controller 104 includes the following: SRAS[2:0]#, which are three copies of the SDRAM row address strobe signal provided to SDRAM modules 200A, B, and C, respectively; SCAS[2:0]#, which are three copies of the SDRAM column address strobe signal provided to SDRAM modules 200A–C, respectively; RCSA[5:0]#, which are row address strobe signals for DRAMs, and chip select signals for SDRAMs; CDQA[5:0]#, which are column address strobe signals for DRAMs, and I/O data mask signals for SDRAMs; CDQB[5,1]#, which are copies of CDQA[5,1]#; and WE[2:0]#, which are three copies of the write enable signal.

The memory data bus width may also be 64 bits (MD[63:0]) or 72 bits (add MECC[7:0]). Signals MAA[13:0] and MAB[13:0] are generated by the controller 104 and routed directly to the memory modules 300A, B, and C. The signals MAB[13:0] are routed to the closest DIMM module, in this case 300A. MAA[13:0] are routed to modules 300B and 300C. In this organization, no external buffering is used with the memory control and address signals. The CKE signal from the memory controller 104 is provided to a buffer 302, which generates three copies of the CKE signals.

Row address strobe or chip select signals RCSA[1:0]# are routed to the memory module 300A, RCSA[3:2]# are routed to the module 300B, and RCSA[5:4]# are routed to the module 300C. Column address strobe or data mask signals CDQA[7:0]# are routed to memory modules 300A and 300B; and CDQA[7,6,4–2,0]# and CDBQ[5,1]# are routed to module 300C.

Figure 4A:
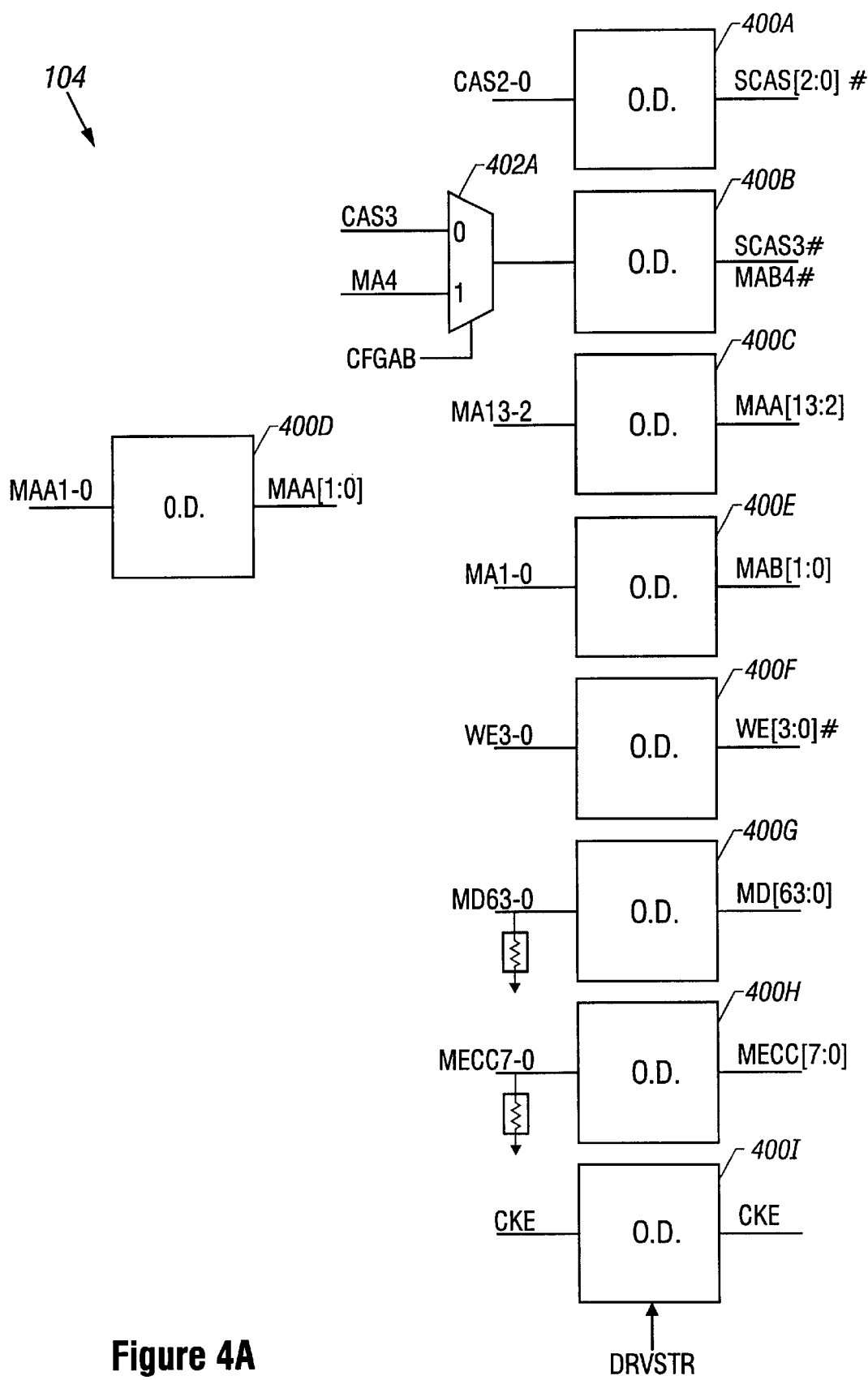
FIGS. 4A–4C are a block diagram of an embodiment of a memory controller in the memory subsystem of FIG. 2.
Figure 4B:
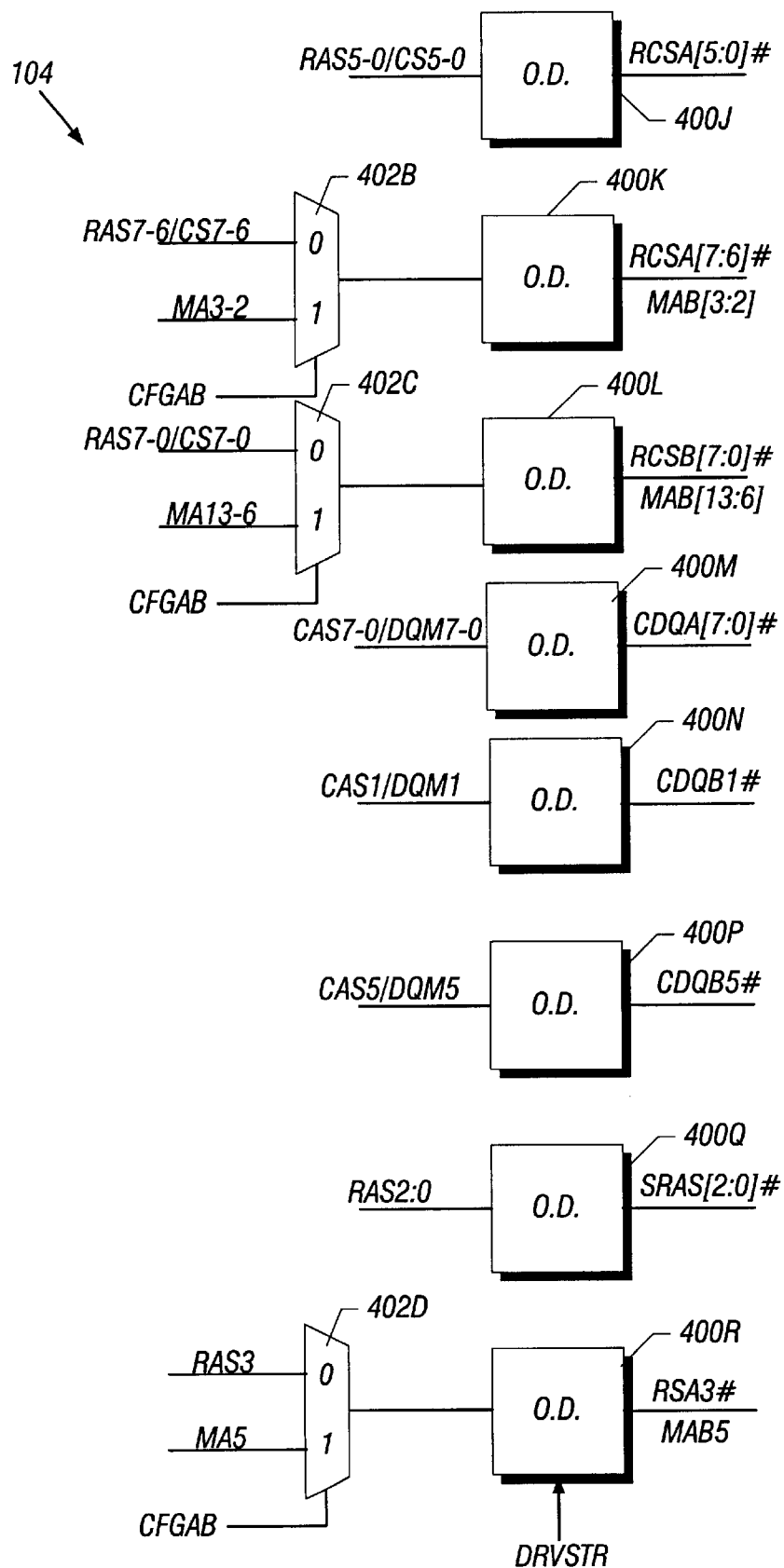
Figure 4C:
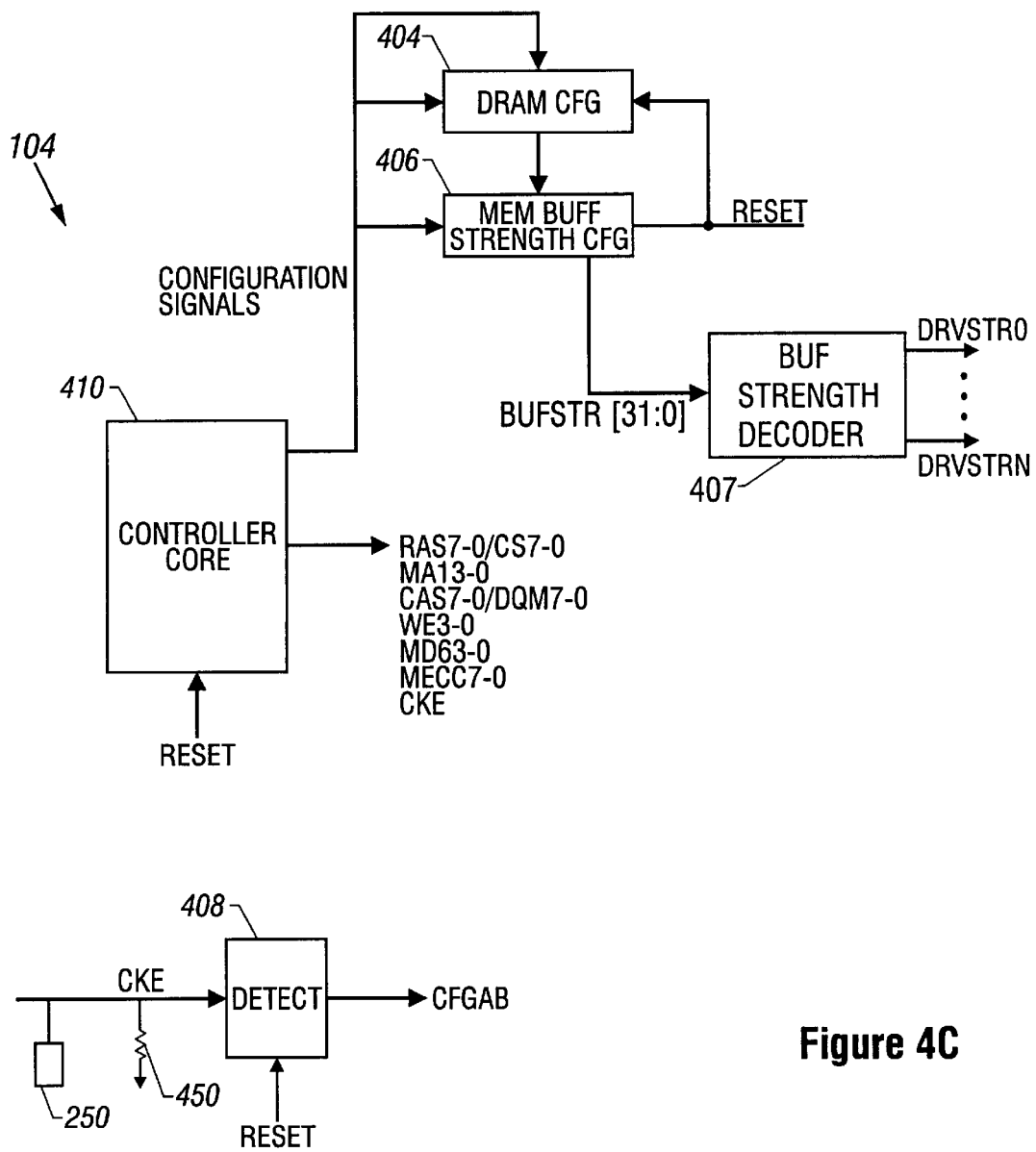

Referring to FIGS. 4A–4C, components in the memory controller 104 are shown. The controller 104 includes a number of programmable output drivers 400A–R configurable to have different drive strengths, as set by a DRVSTR parameter. Each output driver 400 is configurable to have one of several possible drive strengths, e.g., 22 milliamps (mA), 42 mA, and 48 mA maximum current drive strengths. One way of controlling the device strength of an output driver is by controlling the number of drive transistors coupled in parallel that are enabled to drive the output signal.

In FIG. 4C, a controller core 410 forms the core logic of the memory controller. Accesses to configuration registers 404 and 406 are performed through the controller core 410. A memory buffer strength configuration register 406 specifies the strength of output drivers 400, and a DRAM configuration register 406 specifies information associated with the DRAMs, including speed, size, EDO or synchronous, etc.

The memory buffer strength configuration register 406 and other configuration registers in the memory controller 104, such as a DRAM configuration register 404, are set by the BIOS routine.

Configuring the drive strength of the output drivers 400 is achieved by setting a value in the memory buffer strength configuration register 406, which may be a 32-bit register BUFSTR[31:0] with different bits controlling different sets of output drivers. FIGS. 5A–5F illustrates an example of how the bits in the register 406 control the drive strength of different signals. Bits BUFSTR[31:30] control the buffer strength for pins MAA[1:0]; BUFSTR[29:28] control the buffer strength for pins MECC[7:0]; BUFSTR[27:26] control the buffer strength for pins MD[63:0]; BUFSTR[25:24] control pins RCSA[0]# and RCSB[0]#/MAB[6]; BUFSTR[23:22] control pins MAB[1:0]; BUFSTR[21:20] control pins MAA[13:2]; BUFSTR[19:18] control pins RCSA[1]# and RCSB[1]#/MAB[7]; BUFSTR[17:16] control pins RCSA[2]# and RCSB[2]#/MAB[8]; BUFSTR[15:14] control pins RCSA[3]# and RCSB[3]#/MAB[9]; BUFSTR[13:12] control pins RCSA[4]# and RCSB4#/MAB[10]; BUFSTR[11:10] control pins CDQB[5,1]#; BUFSTR[9:8] control pins CDQA[5,1]#; BUFSTR[7:6] control pins CDQA[7:6,4:2,0]#; BUFSTR[5:4] control pins RCSA[5]# and RCSB[5]/MAB[11]; BUFSTR[3:2] control pins RCSA[6]#/MAB[2] and RCSB[6]#/MAB[12]; and BUFSTR[1:0] control pins RCSA[7]#/MAB[3] and RCSB[7]#/MAB[13].

In the embodiment illustrated, pins WE[3:0]#, SRAS[3]#/MAB[5], SCAS[3]#/MAB[4], SRAS[2:0]#, and SCAS[2:0]# are not programmable to different drive strengths, but are set instead to an intermediate drive strength (e.g., 42 mA).

A number of different buffer strengths may be used, with the example of FIGS. 5A–5F showing each set of pins being programmable to one of three values using two BUFSTR bits. The signals BUFSTR[31:0] are provided to a decoder 407, which decodes the input bits to outputs DRVSTR0 to DRVSTRn, which are routed to the appropriate output drivers 400 to control corresponding output pins.

To program which set of multiplexed signals are output onto certain output pins of the memory controller, the state of the CKE pin is sensed by a detector 408 during power up (RESET is high). The CKE pin is tied internally to a pull-down resistor 450. The state of CKE is sensed when the signal RESET is high. If the first memory organization is desired, the signal CKE is tied high externally by the element 250; if the second memory organization is desired, the signal CKE is left floating externally, which allows the pull-down resistor 450 to pull CKE low. Whether to tie CKE high or not may be selected by the computer system manufacturer depending on the system requirements.

The detector 408 latches this initial state of CKE and provides an indication CFGAB to the rest of the memory controller 104. The signal CFGAB is routed to multiplexers 402 to select which signals to output on multiplexed output pins.

The controller core 410 also outputs signals that are provided to the output drivers 400, including control signals RAS7–0/CS7–0 provided to output drivers 400J, K, L, Q, R that drive signals RCSA#, RCSB#, and SRAS#. Control signals CAS7–0/DQM7–0 are routed to output drivers 400A, B, M, N, P that drive CDQA#, CDQB#, and SCAS#. The address signals MA13–0 are routed to the output drivers 400B–E, K, L that drive MAA[13:0] and MAB[13:0]. Write enable signals WE3–0 are routed to the output drivers 400F that drive WE#. Signals MD63–0 and MECC7–0 are routed to output drivers 400G, H that drive MD and MECC. The signal CKE is routed to the output driver 400I.

The multiplexed output pins are driven by output drivers 400B, 400K, 400L, and 400R. Each of the output drivers 400B, K, L, and R receives the outputs of multiplexers 402A, 402B, 4020, and 402D, respectively. Each multiplexer 402 receives two inputs that are selected by the configuration bit CFGAB from the CKE detector 408. In the first memory organization, input "0" of the multiplexer is selected. In the second memory organization, the "1" input is selected.

The multiplexer 402A receives CAS3 (column address strobe 3) at its 0 input and MA4 (memory address 4) at its 1 input. The output driver 400B outputs SCAS3# in configuration 1 and MAB4# in configuration 2. The multiplexer 402B receives RAS7–6/CS7–6 (row address strobe 7–6 or chip select 7–6) at its "0" input, and MA3–2 (memory address 3–2) at its "1" input. The multiplexer 402C receives signals RAS7–0/CS7–0 (row address strobe 7–0 or chip select 7–0) at its "0" input and MA13–6 (memory address 13–6) at its "1" input. The output driver 400L generates RCSB[7:0]# in configuration 1 and MAB[13:6] in configuration 2. The multiplexer 402D receives RAS3 (row address strobe 3) at its "0" input and MA5 (memory address 5) at its "1" input. The output driver 400R outputs SRAS3# in configuration 1 and MAB5 in configuration 2.

Other embodiments are within the scope of the following claims. Specific signals and components have been identified in the memory controller. The ability to program the output drive strengths of the output drivers may be applied to a memory controller with fewer output signals, e.g., a memory controller that supports only the DRAM configuration or only the SDRAM configuration, for example. In addition, the number of modules illustrated are only examples, as other combinations of memory modules may be used. A memory controller for use with other types of memory subsystems may also be configured to work with multiple memory organizations; such other memory subsystems include video memory, disk controller buffer memory, network controller buffer memory, etc. In addition, instead of programming a configuration register to program the output driver current drive strengths, other configuration elements may be used, such as configuration pins that are coupled to different states for different drive strengths. Other output characteristics of the output drivers may also be controlled based on the different memory organizations, such other characteristics including the slew rate of the output driver, the output voltage (e.g., CMOS or TTL), etc.

Although the present invention has been described with reference to specific exemplary embodiments, various modifications and variations may be made to these embodiments without departing from the spirit and scope of the invention as set forth in the claims.

What is claimed is:

1. A system, comprising:
   a memory subsystem configurable to one of multiple memory organizations; and
   a memory controller providing at least one output signal coupled to the memory subsystem, the memory controller including:
   a storage element programmable to contain one of multiple values dependent upon the memory organization;
   at least one output driver to drive the at least one output signal and having an output driver current drive strength; and
   a decoder to adjust the output driver current drive strength based on the value contained in the storage element.

2. The system of claim 1, further comprising:
   a processor that executes a routine, the routine determining a type of memory organization and programming the memory controller storage element accordingly.

3. The system of claim 2, wherein the routine includes a BIOS routine.

4. The system of claim 1, wherein the memory subsystem includes a stored indication of a type of memory organization.

5. The system of claim 4, wherein the stored indication is in a nonvolatile memory.

6. The system of claim 5, wherein information stored in the nonvolatile memory is configured according to a serial presence detect protocol.

7. The system of claim 1, wherein the memory subsystem includes memory modules.

8. The system of claim 7, wherein the memory subsystem according to a first organization has a first number of memory modules.

9. The system of claim 8, wherein the memory subsystem according to a second organization has a second number of memory modules.

10. The system of claim 7, wherein the modules include single in-line memory modules.

11. The system of claim 7, wherein the modules include double in-line memory modules.

12. The system of claim 1, wherein the memory controller further comprises at least one output pin coupled to an output of the at least one output driver.

13. The system of claim 1, wherein the memory controller further comprises one or more additional output drivers each having an output driver current drive strength, the decoder to adjust the output driver current drive strength of each of the one or more additional output drivers based on the value contained in the storage element, the memory controller further comprising output pins coupled to corresponding outputs of the output drivers.

14. A method of controlling a memory subsystem having one of multiple organizations in a system, comprising:

determining the memory organization; and a decoder adjusting at least an output driver of a memory controller coupled to the memory subsystem to have one of plural output drive strengths based on the determined memory organization.

15. The method of claim 14, wherein the adjusting adjusting step includes programming the output drive strength of output drivers in the memory controller.

16. The method of claim 14, further comprising:

accessing a predetermined storage element in the memory subsystem to retrieve information regarding the memory organization.

17. The method of claim 14, further comprising controlling multiplexers in the memory controller to select one of a first set and a second set of output signals to output on output pins of the memory controller.

18. The method of claim 14, wherein adjusting the at least one output driver comprises adjusting the at least one output driver having an output coupled to an output pin.

19. A memory controller for use with a memory subsystem, comprising:

a storage element that stores a value set according to a selected one of plural configurations for the memory subsystem;

at least one output signal driver having an output driver current drive strength; and a decoder to vary the output driver current drive strength depending on the selected one of plural configurations.

20. The memory controller of claim 19, wherein the storage element includes a configuration register.

21. The memory controller of claim 19, wherein the configuration selected for the memory subsystem includes one of multiple memory organizations.

22. The memory controller of claim 21, wherein the memory subsystem in the multiple memory organizations have different numbers of memory modules.

23. The memory controller of claim 19, further comprising:

multiplexers that provide signals received by corresponding output signal drivers, the multiplexers controlled to select one of multiple signals for output.

24. The memory controller of claim 23, further comprising:

a predetermined pin having a state; and a detector coupled to detect the state of the predetermined pin, wherein the detector outputs a value to control each of the multiplexers.

25. The memory controller of claim 19, further comprising output pins and multiplexers to receive a first set of input signals and a second set of input signals, the multiplexers to select one of the first set and second set of input signals to provide to the output pins based on the value.

26. The memory controller of claim 19, further comprising at least one output pin coupled to an output of the at least one output signal driver.

27. The memory controller of claim 19, wherein the at least one output signal driver comprises different numbers of transistors to deliver different drive strengths.

28. The memory controller of claim 19, further comprising one or more additional output signal drivers each having an output driver current drive strength, the decoder to vary the output driver current drive strength of each of the one or more output signal drivers depending on the selected one of plural configurations.

29. The memory controller of claim 28 further comprising plural output pins coupled to corresponding outputs of the output signal drivers.

* * * * *

UNITED STATES PATENT AND TRADEMARK OFFICE
CERTIFICATE OF CORRECTION

PATENT NO. : 6,298,426 B1
DATED : October 2, 2001
INVENTOR(S) : Jasmin Ajanovic

It is certified that error appears in the above-identified patent and that said Letters Patent is hereby corrected as shown below:

Column 9,
Lines 13-14, delete "adjusting", second occurrence.

Signed and Sealed this

Twenty-fifth Day of June, 2002

Attest:

JAMES E. ROGAN
Attesting Officer
Director of the United States Patent and Trademark Office